(12) United States Patent
Spiekermann et al.

(10) Patent No.: US 7,362,783 B2
(45) Date of Patent: Apr. 22, 2008

(54) OPTICAL FREQUENCY MIXING

(75) Inventors: Stefan Spiekermann, Järfalla (SE); Katrin Ekvall, Stockholm (SE); Håkan Karlsson, Stockholm (SE)

(73) Assignee: Cobolt AB, Stockholm (SE)

( * ) Notice: Subject to any disclaimer, the term of this patent is extended or adjusted under 35 U.S.C. 154(b) by 351 days.

(21) Appl. No.: 10/480,311

(22) PCT Filed: Jun. 13, 2002

(86) PCT No.: PCT/SE02/01139

§ 371 (c)(1), (2), (4) Date: Feb. 6, 2004

(87) PCT Pub. No.: WO02/103863

PCT Pub. Date: Dec. 27, 2002

(65) Prior Publication Data

US 2004/0125834 A1    Jul. 1, 2004

(30) Foreign Application Priority Data

Jun. 15, 2001  (SE) ................................ 0102139

(51) Int. Cl.
*H01S 3/10* (2006.01)
(52) U.S. Cl. ................. 372/28; 372/21; 372/22
(58) Field of Classification Search ......... 372/28, 372/21, 22
See application file for complete search history.

(56) References Cited

U.S. PATENT DOCUMENTS 4,879,723 A * 11/1989 Dixon et al. ................. 372/21
5,345,457 A * 9/1994 Zenzie et al. ................. 372/22
5,504,616 A    4/1996 Shinozaki et al.
5,832,009 A    11/1998 Kikuchi
5,982,792 A    11/1999 Kasamatsu et al.
H1965 H  *  6/2001 Burns et al. ................. 372/22

FOREIGN PATENT DOCUMENTS

| JP | 7-92513 | 4/1995 |
|---|---|---|
| JP | 09-022037 | 1/1997 |
| JP | 11-052443 | 2/1999 |
| JP | 11-251666 | * 9/1999 |

OTHER PUBLICATIONS

Shiro Shichijyo, et al., Efficient intracavity sum-frequency generation of 490-nm radiation by use of potassium niobate, 1994 Optical Society of America, received Feb. 28, 1994, 3 pp.
Hanno M. Kretschmann, et al., All-solid-state continuous-wave doubly resonant all-intracavity sum-frequency mixer, 1997 Optical Society of America, received Jun. 12, 1997, pp. 1461-1463.

* cited by examiner

*Primary Examiner*—Dung (Michael) T. Nguyen
(74) *Attorney, Agent, or Firm*—Buchanan Ingersoll & Rooney PC

(57) ABSTRACT

A method of generating coherent radiation, wherein a first fundamental beam of radiation from a four level laser and a second fundamental beam of radiation from a three level laser are mixed in a non-linear body to obtain an output beam at the sum frequency of the two fundamental beams. The invention also relates to an arrangement for carrying out the method.

20 Claims, 3 Drawing Sheets

OPTICAL FREQUENCY MIXING

TECHNICAL FIELD

The present invention relates to sum frequency mixing of two fundamental beams of radiation, to produce a generated beam of radiation having a shorter wavelength than each of the fundamental beams. In particular, the present invention relates to sum frequency mixing of light from a four level laser and light from a three level laser.

TECHNICAL BACKGROUND

Generation of light in solid-state lasers is based on electronic transitions in active ions doped into a host material. Depending on the type of active ion, and on the host material, different wavelengths are achievable from the transition.

The wavelengths obtained from solid-state lasers are typically in the near infrared region of the electromagnetic spectrum. In order to reach shorter wavelength, for example visible radiation, various techniques based on non-linear interactions are widely employed.

One commonly used class of active ions are rare earth metals. These metal ions are doped into a host material, which is either crystalline or amorphous, to obtain an active laser medium. Examples of rare earth metals used in solid-state lasers are Nd, Yb, Ho, Er, Tm and Pr. However, other rare earths are also used in some cases.

Due to the environment of the crystal lattice or the amorphous host, each of the electronic states of the active ions is splitted into a manifold. Both the excited states of the active ions and the ground state are in fact manifolds.

Normally, when a transition to the ground state is used in a laser, the laser is called a three level laser. The reason is that three levels are involved in the process of generation of light. The first level involved is the pump level, to which the ions are excited by means of an optical pump source. The ions are rapidly transferred from this pump level to a lower energy level, which is called the upper laser level. The lifetime of this level is comparatively long compared to the other levels involved. Therefore, this upper laser level is often referred to as a "metastable" level. Transition from the upper laser level to a lower energy level may now be stimulated by light at the appropriate frequency (of the appropriate energy). The transition from the upper laser level takes place to the lower laser level, which in the case of three level lasers is the ground state of the active ion.

When the lower laser level is an excited state of the active ion, the laser is called a four level laser, since four levels are involved in the generation of light. In case of a four level laser, the lower laser level is quickly emptied by spontaneous transition of the ions to the ground state. Consequently, four level laser are typically more efficient than three level lasers, because population inversion (the requisite for laser action) is more easily obtained.

One class of three level lasers is the so-called quasi three level lasers. In this case, the lower laser level is, in fact, within the manifold of the ground state. However, the lower laser level is slightly above the actual zero level. Consequently, the lower laser level has some thermal population at equilibrium. This thermal population causes reabsorption of light at the laser wavelength, whence the efficiency is lower than for four level lasers. However, the efficiency is still higher than for "true" three level lasers, where the lower laser level is the zero level.

The $^4F_{3/2}$–$^4I_{11/2}$ (as well as $^4F_{3/2}$–$^4I_{13/2}$) transition in Nd doped laser crystals or glasses is commonly utilised in highly efficient four level solid state lasers emitting light of wavelengths between 1040 and 1080 nm (1300–1450 nm). This system is a four level system, because the $^4I_{11/2}$ state is very short-lived and the ions in this level are almost immediately transferred to the ground state.

When using the ground state manifold $^4I_{9/2}$ of Nd ions as the lower laser level, the laser wavelength decreases to a substantially shorter emission wavelength between 900 and 950 nm. However, a drawback of this approach is the above-mentioned quasi three level nature of the system. It suffers from low gain and temperature-dependent reabsorption losses due to the thermal population of the lower laser level. Another quasi-three level laser system that has achieved attention is the Yb doped laser crystal or glass (laser transition $^2F_{5/2}$–$^2I_{7/2}$). This system has some advantages, such as low pump defect (small energy difference between the pump level and the upper laser level) and the lack of excited state absorption. The wavelength range that can be covered with Yb-doped materials ranges from 980 to 1070 nm. As mentioned above, there are other rare earth ions that can be used as active ions in solid state lasers. For example Ho or Tm gives a quasi three level laser, but with substantially longer output wavelength (around 2000 nm).

Although quasi three level lasers have lower gain, and hence are typically less efficient and quite sensitive to losses, their overall performance can compete with that of four level lasers, when the laser design is carefully optimised. Optimising includes achieving an optimum balance between high pump absorption and low reabsorption loss, and finding the optimum output coupling. Furthermore, as bright a pump source as possible should be used (preferably laser diodes), Second harmonic generation is a widely used technique to convert the above infrared lasers into the visible spectrum. Frequency doubling of the output from a four level laser typically leads to the green or red spectral region, while doubling of the output from a three level laser results in blue or green light. Both types of lasers have been implemented in various configurations and some are already commercially available. However, a number of applications need laser light in-between the green and blue spectral regions (480–510 nm) as well as in-between the orange and the green spectral regions (535–600 nm).

Currently, only ion-gas lasers cover the green to blue spectral region, but these systems are bulky with very high power consumption and short lifetime. One such laser is the well known Argon-ion laser. Just recently, a second approach has been proposed, which is frequency doubling laser diodes at around 975 nm. However, diodes with single transversal mode are required in order to obtain sufficiently good performance, and there are serious restrictions for fabrication of such diodes with high enough output power, e.g. the lifetime suffers. Additionally, the output spectrum gets very broad, which is disadvantageous for the non-linear doubling crystals with their narrow wavelength acceptance bandwidth.

Regarding the green to red spectral region, there has been tried a variety of other approaches. One way is to employ dye-lasers. However, the use of dye-lasers is associated with use of various liquid dyes, which are awkward to work with and may even be poisonous. Furthermore, up-conversion lasers or intracavity doubling of Raman shifted solid state lasers have been proposed. Unfortunately, up-conversion lasers suffer from instabilities, and frequency doubling of Raman-lasers require Q-switching to be sufficiently efficient.

Thus, in order to reach the above-mentioned spectral regions, and to achieve a sufficiently high output power, new coherent light sources are needed.

SUMMARY OF THE INVENTION

One object of the present invention is to provide coherent radiation from a solid-state source that meets the above requirements on emission wavelengths.

It is also an object of the present invention to provide coherent radiation at these wavelengths from a source that is scalable in power, compact and cost-effective.

These objects are met by a method of the kind set forth in the appended claims.

According to the invention, coherent radiation is generated by sum frequency mixing of radiation from one four level laser and radiation from one three level laser. Typically, in connection with the present invention, the three level laser is a quasi three level laser, although "true" three level lasers may also be used. By sum frequency mixing of light from a three level laser and light from a four level laser, the low efficiency of the three level laser is, at least to some extent, compensated by the higher efficiency of the four level laser. Furthermore, wavelengths that are difficult, or even impossible, to obtain in solid-state lasers by direct generation or by frequency doubling are provided. By virtue of the present invention allowing the use of standard laser diodes as a pump source, power scaling to high output powers is possible.

It is preferred that the sum frequency mixing is performed within the resonant cavity of the four level laser. In this way, intense radiation from the four level laser is available, while the three level laser is left undisturbed. However, it is also possible to perform the sum frequency mixing outside of the resonant cavities of both lasers.

As will be further explained below, the use of sum frequency mixing of one three level laser and one four level laser has the further advantage that the output is less noisy.

Sum frequency mixing of radiation from a four level laser and radiation from a quasi three level laser has several advantages and solves some serious problems in the prior art. Firstly, a range of wavelengths that were previously impossible or very difficult to achieve from solid-state lasers are possible to obtain. For example, the bulky and expensive Ar-ion lasers may be replaced by a source emitting the sum frequency of a four level laser and a quasi three level laser. One important laser line from Ar-ion lasers is 488 nm, which can be replaced by sum frequency mixing of proper choices of radiation sources according to the present invention. This will be further elucidated in the detailed description below. Secondly, by virtue of the high efficiency of four level lasers, the frequency mixing provides comparatively high output powers in these attractive wavelength ranges. Thirdly, standard laser diodes can be used as pump sources for the lasers used in accordance with the present invention. Since laser diodes emitting at appropriate pump wavelengths for these solid-state lasers are commercially available, and have high brightness and high output powers, it is possible to obtain high output powers at the sum frequency at a reasonable cost by power scaling.

Traditionally, non-linear interactions, such as frequency mixing, have been performed in birefringent optical crystals, which have been cut in appropriate directions in order to provide phasematching of the fundamental beams and the generated beam. This way of phasematching non-linear interactions of light is referred to as conventional phasematching, in contradistinction to quasi phasematching (QPM) as will be described briefly below. In connection with the present invention, it is in some cases possible to utilise conventional phasematching. However, for some of the conceivable interactions, there is no suitable choice of birefringence for which phasematching is obtained at reasonable temperatures. Quasi phasematching also provides interactions that are free of walk-off, whereby the conversion can be more efficient. In addition, quasi phasematching provides access to larger non-linearities in the non-linear body, since quasi phasematching can be arranged for any polarisation direction. Of course, larger non-linearities provide for higher conversion efficiencies. Therefore, it is preferred to utilise quasi phase matching.

In quasi phasematching, birefringence of the non-linear crystal is not necessarily of any importance. Instead, phasematching is achieved by a spatial periodic modulation of the non-linear coefficient of the non-linear crystal, which modulation periodically causes a reset of the mismatch between the phases of the fundamental beams and the generated beam. Quasi phasematching is conveniently achieved for a selected non-linear optical interaction in periodically poled non-linear crystals. In this way, the power of the generated beam increases along the propagation through the non-linear crystal. One very important advantage of quasi phasematching is that any non-linear interaction can be phasematched by a proper choice of spatial period of the periodic structure. The only limitation is that the wavelengths of the beams participating in the interaction must be within the transparency window of the material. Otherwise, absorption losses would destroy the efficiency of the process.

Hence, it is preferred to utilise quasi phasematching for the sum frequency mixing according to the present invention, whereby a wide range of wavelengths is obtainable.

BRIEF DESCRIPTION OF THE DRAWINGS

In the following detailed description of some preferred embodiments, reference is made to the accompanying drawings, on which.

On the drawings, like parts are designated like reference numerals.

DETAILED DESCRIPTION OF PREFERRED EMBODIMENTS

Figure 1:
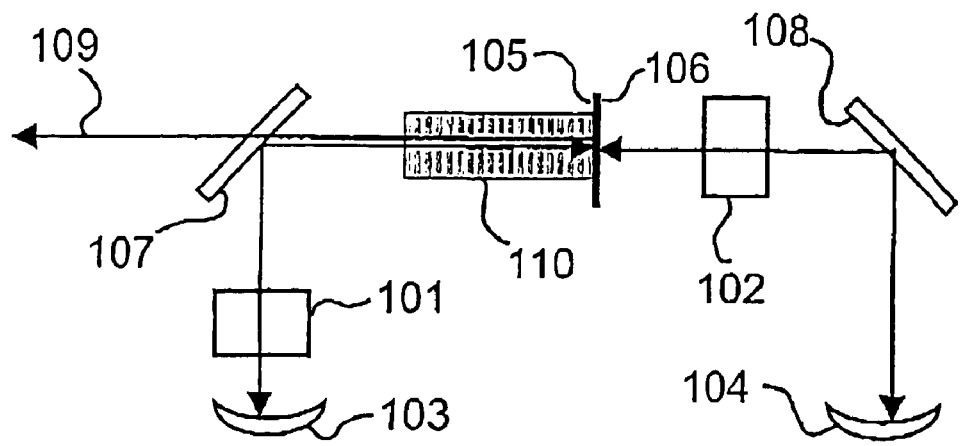
FIG. 1 schematically shows a first set-up for sum frequency generation according to the present invention, in which a common mirror for the two fundamental lasers is used.

By way of introduction, different preferred choices of fundamental wavelengths will be described. Then, some preferred set-ups for providing the frequency mixing will be described.

For the four level laser to be utilised in accordance with the present invention, it is preferred to utilise neodymium ions as the active, light generating constituent. The Nd ions can be doped into a variety of host materials. Below in table 1, some preferred hosts are mentioned, together with the most interesting emission lines. There are, of course, various other possibilities than those mentioned in this table.

TABLE 1

| 4-level transitions | | Quasi 3-level transitions | |
|---|---|---|---|
| Active material | Emission lines [nm] | Active material | Emission lines [nm] |
| Nd: YAG | 1064 | Nd: YAG | 938 |
| Nd: GYAG | 1319 | Nd: GYAG | 946 |
|  | 1338 | Nd: YVO$_4$ | 914 |
|  | 1356 | Nd: GdVO$_4$ |  |
|  | 1440 | Nd: YLiF$_4$ | 903 |
| Nd: YVO$_4$ | 1342 |  | 908 |
| Nd: GdVO$_4$ | 1064 | Nd: YAlO$_3$ | 930 |
| Nd: YLiF$_4$ | 1053 | Yb: YAG | 980–1070 |
|  | 1047 | Yb: S-FAP | 1047 |
| Nd: LSB | 1063 | Nd: Glass | 890–940 |
| Nd: YAlO$_3$ | 1340 | Tm: YAG | 2013 |
| Nd: Glass | 1040–1070 |  |  |

Common to all laser materials mentioned in table 1 is that they can be optically pumped by standard laser diodes. Preferably, in order to achieve high efficiencies and output powers, high brightness laser diodes are utilised for the purposes of pumping. By appropriate choices of emission lines, sum frequency mixing of a four level emission and a quasi three level emission gives an output of wavelengths that are very difficult or complicated to obtain by other means. Particularly, since suitable high power pump diodes are available, the output power at the sum frequency can be scaled up in a straightforward manner.

For example, the important emission line of argon ion lasers at 488 nm can be obtained by mixing of the four level emission at 1047 nm of Nd:YLiF$_4$ with the quasi three level emission at 914 of Nd:YVO$_4$. Coherent radiation at 488 nm is of much interest in biological analysis, where Ar-ion lasers are employed today. Hence, the present invention provides a new way of obtaining this important wavelength of radiation. Bulky and expensive Ar-ion lasers can be replaced by a simple, cheap and durable solid-state laser with sum frequency mixing according to above. Commercially, this is very attractive indeed.

In another example, emission at 488 nm is obtained by mixing the four level emission at 1053 nm of Nd:YLiF$_4$ with the quasi three level emission at 908 nm of Nd:YLiF$_4$.

By sum frequency mixing of the four level emission at 1319 of Nd:YAG with the quasi three level emission at 1030 nm of Yb:YAG, a wavelength of 578 nm is obtained. This wavelength is of interest in various medical applications, e.g. blood analysis.

A general advantage of sum frequency mixing compared to second harmonic generation (frequency doubling) is that the generated beam is less noisy. The output of a laser employing intracavity frequency doubling exhibits large amplitude fluctuations and longitudinal-mode instabilities. Such instabilities originate from coupling, in the non-linear crystal, of different longitudinal modes of the laser oscillator by sum-frequency generation (in addition to the phase-matched frequency doubling of each mode). When sum frequency mixing two separate beams of substantially different wavelengths, where only the process of sum-frequency mixing is phase-matched in the non-linear crystal and not the doubling of each frequency, there is no coupling of the longitudinal modes. This makes the laser system substantially more stable. Nevertheless, the system may still tend to be unstable, since the two lasers are subjected to a non-linear coupling by the frequency converting mechanism. This effect can be further reduced by decoupling the two lasers by inserting the non-linear crystal in only one of the two laser cavities ("single-resonant frequency mixing"), while the other one is isolated from the non-linear body. Finally, non-linear coupling can be avoided altogether by placing the non-linear crystal outside of both cavities. This is referred to as "extra-cavity frequency mixing".

In the following, some preferred set-ups for carrying out the frequency mixing will be described. Common to these set-ups is that care is taken not to adversely affect the rather sensitive quasi three level laser. Therefore, generated light at the sum frequency is preferably not allowed to propagate within the resonant cavity of the quasi three level laser. In the figures, each resonant cavity is indicated by a two-headed arrow.

A first preferred arrangement, or set-up, is schematically shown in FIG. 1.

In the shown arrangement, a resonant laser cavity for a four level laser is defined by a first mirror 103 and a second mirror 105. Within the resonant laser cavity for the four level laser, there is provided a first active laser medium 101, which has the ability to emit optical radiation by electronic transitions in a four level system. The cavity mirrors 103 and 105 both have high reflectance at the four level laser wavelength. In this way, the losses due to out-coupling of generated radiation are minimised.

Furthermore, a resonant laser cavity for a three level laser is defined by a third mirror 104 and a fourth mirror 106. Within the resonant laser cavity for the three level laser, there is provided a second active medium 102, which has the ability to emit optical radiation by electronic transitions in a three level system. The reflectance of the mirrors 104 and 106 of the three level cavity are designed to be sufficiently low at every four level transition of the active laser medium 102 in order to prevent parasitic lasing in the three level laser. The mirror 104 has a high reflectance at the three level laser wavelength, while the mirror 106 has a slightly reduced reflectance at this wavelength in order to allow output of generated radiation at 109.

In the resonant laser cavity of the four level laser, there is provided a non-linear crystal 110. As shown, the non-linear crystal is placed within the resonant laser cavity of the four level laser. By such placement, the three level laser is unaffected by the presence of the non-linear crystal. At the same time, the power level of radiation from the four level laser inside the non-linear body is maximised by having said crystal inside the resonant cavity of the four level laser.

In the arrangement shown in FIG. 1, the mirrors 105 and 106 are, in fact, a common entity. More particularly, these mirrors are constituted by a dielectric stack deposited upon one side face of the non-linear crystal. By having said mirrors commonly applied to a side face of the non-linear crystal as shown, the two fundamental beams of radiation (i.e. radiation from the four level laser and radiation from the three level laser) are automatically collinear once the two resonant cavities have been aligned.

For practical reasons, and as shown schematically in the figure, the two resonant cavities are folded by a respective folding mirror 107 and 108. For the purpose of letting generated radiation at the sum frequency out from the arrangement, the folding mirror 107 of the four level laser is dichroic, essentially passing all radiation at said sum frequency. Firstly, the folding mirrors prevent light at the sum frequency to come into the lasers and adversely affect these by, for example, absorption in the active media. In addition, the folding mirrors have the purpose of suppressing parasitic lasing in the three level laser at the competing four level transition. Parasitic lasing is avoided by having low reflectance for the wavelengths to be suppressed.

Although not shown in the figure, it is to be understood that the active media 101, 102 of the respective laser are pumped by an optical pump source. Preferably, pumping is effected in a longitudinal configuration by means of high brightness laser diodes.

Any of the emission lines listed in table 1 may be used in the arrangement shown in FIG. 1. For example, the preferred generation of radiation at 488 nm may be performed by using a Nd:YLiF$_4$ crystal as the four level medium 101, the four level laser operating at 1047 nm, and by using a Nd:YVO$_4$ crystal as the three level medium 102, the three level laser operating at 914 nm. By sum frequency mixing of these two fundamental beams of radiation in the non-linear crystal 110, an output 109 at 488 nm is obtained.

Furthermore, it is preferred that the sum frequency mixing is performed by means of a periodically poled non-linear crystal, constituting the non-linear crystal 110. Preferred selections of non-linear crystals for periodic poling are potassium-titanyl-phosphate (KTP), lithium-niobate (LN), lithium-tantalate (LT), rubidium-titanyl-arsenide (RTA), potassium-titanyl-arsenide (KTA), rubidium-titanyl-phosphate (RTP), and potassium niobate (KN).

Again, it is to be noted that the three level laser is not disturbed by any non-linear loss, i.e. the non-linear crystal 110 is outside of the resonant laser cavity.

Figure 2:
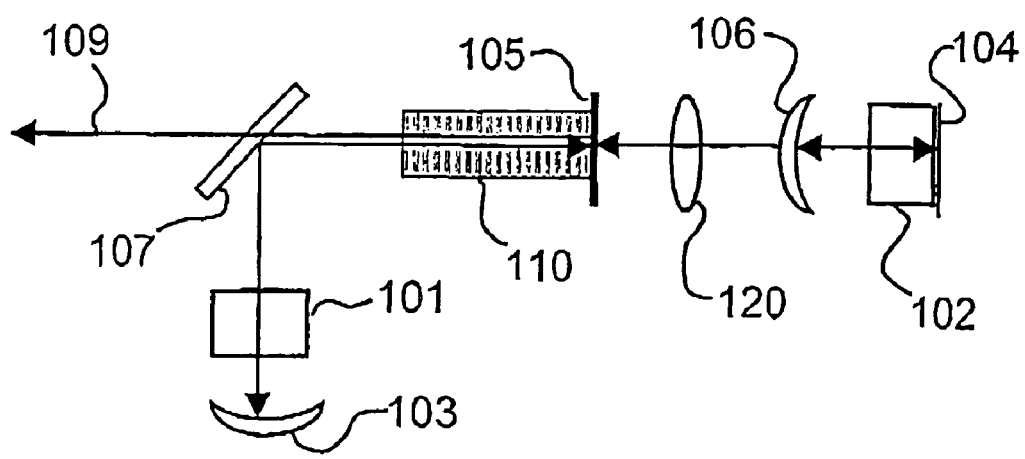
FIG. 2 schematically shows a second set-up for sum frequency generation according to the present invention, in which separate cavity mirrors are used.

Another preferred arrangement is schematically shown in FIG. 2. This arrangement is similar to the one shown in FIG. 1. However, in this case, the cavity mirrors 105 and 106 are separate. In addition, a converging lens 120 is introduced between the output mirror 106 of the three level laser and the non-linear crystal 110. The converging lens 120 produces a focused waist of radiation from the three level laser inside the non-linear crystal. As known in the art, the conversion efficiency in non-linear interactions is higher for a higher intensity of the fundamental radiation. Consequently, it may be preferred to focus radiation into the non-linear crystal in order to increase the intensity.

Figure 3:
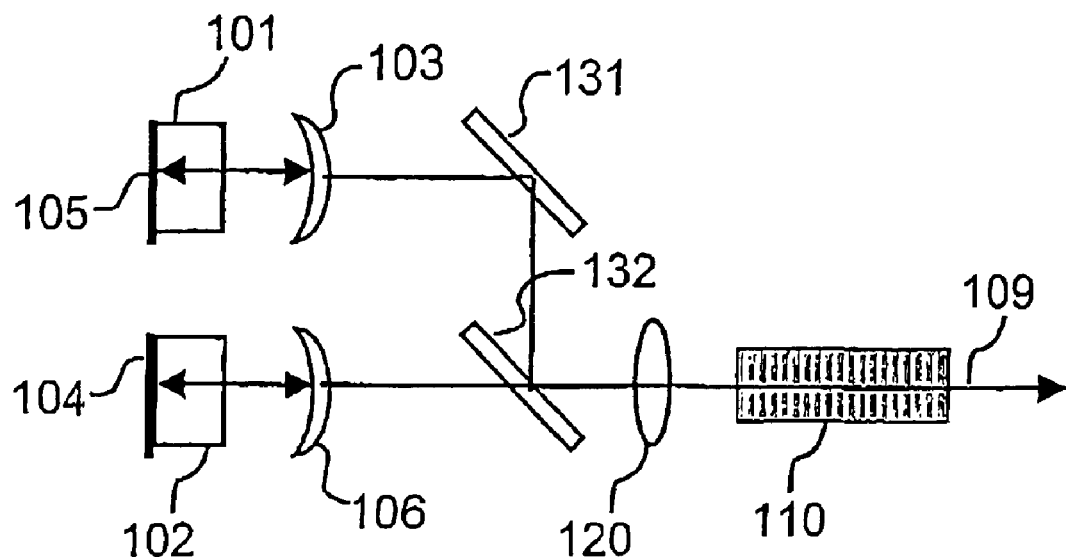
FIG. 3 schematically shows a third set-up for sum frequency generation according to the present invention, in a configuration of collinear extra-cavity mixing.

In FIG. 3, yet another arrangement is shown. In this case, the sum frequency mixing is performed outside of both the four level cavity and the three level cavity.

The resonant cavity for the four level laser is defined by a first mirror 103 and a second mirror 105. Within this resonant cavity, the first active laser medium 101 is placed. Radiation output from this cavity is provided by the mirror 103, which has a slightly reduced reflectance at the lasing wavelength of this four level laser. The output is directed by means of a first guiding mirror 131 and a second guiding mirror 132 into the non-linear crystal 110.

The resonant cavity for the three level laser is defined by a third mirror 104 and a fourth mirror 106. Within this resonant cavity, the second active laser medium 102 is placed. Radiation output from this cavity is provided by the mirror 106, which has a slightly reduced reflectance at the lasing wavelength of this three level laser. Again, the reflectance of the mirrors 104 and 106 is such that parasitic lasing at any four level transition is prevented. The output is passed through the second guiding mirror 132 towards the non-linear crystal 110.

As indicated, the output from the four level laser and from the three level laser are made collinear by the second guiding mirror 132. Before entering the non-linear crystal 110, both fundamental beams are focused by a converging lens 120 to form a waist inside the non-linear crystal 110. In this way, efficient sum frequency mixing is performed outside of both resonant cavities to produce output radiation at 109 of the sum frequency of said fundamental beams. By performing the sum frequency generation outside of both resonant cavities, non-linear losses are avoided for both lasers and a stability advantage is obtained.

Figure 4:
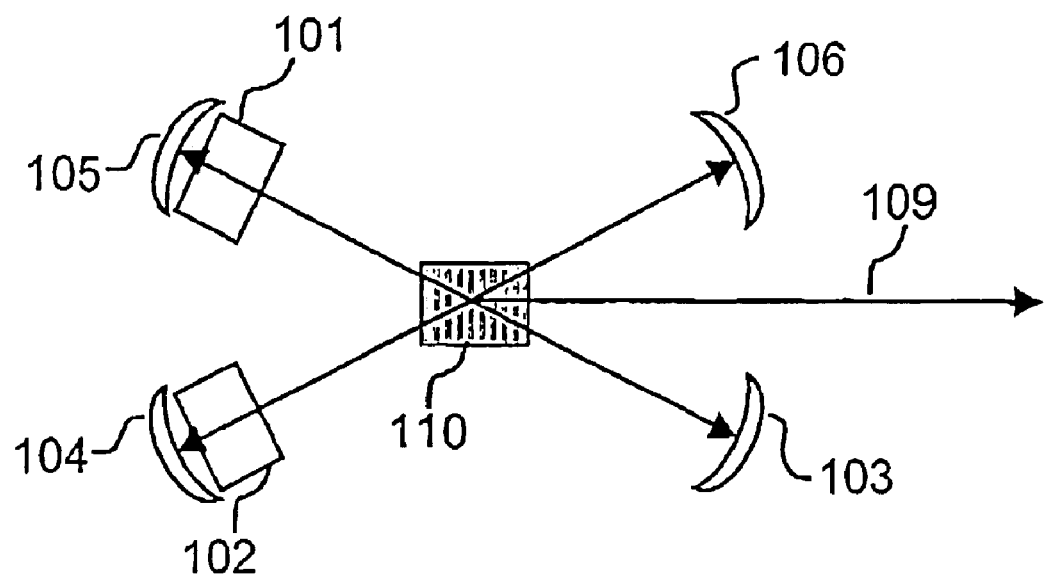
FIG. 4 schematically shows a fourth set-up for sum frequency generation according to the present invention, in a configuration of non-collinear intra-cavity mixing.

Another possible arrangement is schematically shown in FIG. 4. Here, the non-linear crystal is, in one sense, within both resonant cavities. However, as will be described below, no generated radiation will ever enter either of the laser cavities.

As illustrated in the figure, the generated light (i.e. radiation at the sum frequency) is non-collinear with each and one of the fundamental beams of radiation. The non-linear optical body is designed to provide phasematching in a direction that is non-parallel with either of the fundamental beams (i.e. the resonant modes within the four and three level lasers). In other words, the non-linear body is designed to prevent any wave vector in these directions. Hence, there will be no light at the sum frequency in either of the fundamental lasers. More particularly, the two fundamental lasers are coupled only by the non-linearity of the non-linear body. In this way, although the sum frequency mixing is actually performed within the resonant cavities of both of the fundamental lasers, detrimental effects due to mode coupling are minimised. At the same time, the high intensity within each of the resonant cavities is available for sum frequency mixing into an output beam at a higher frequency.

Figure 5:
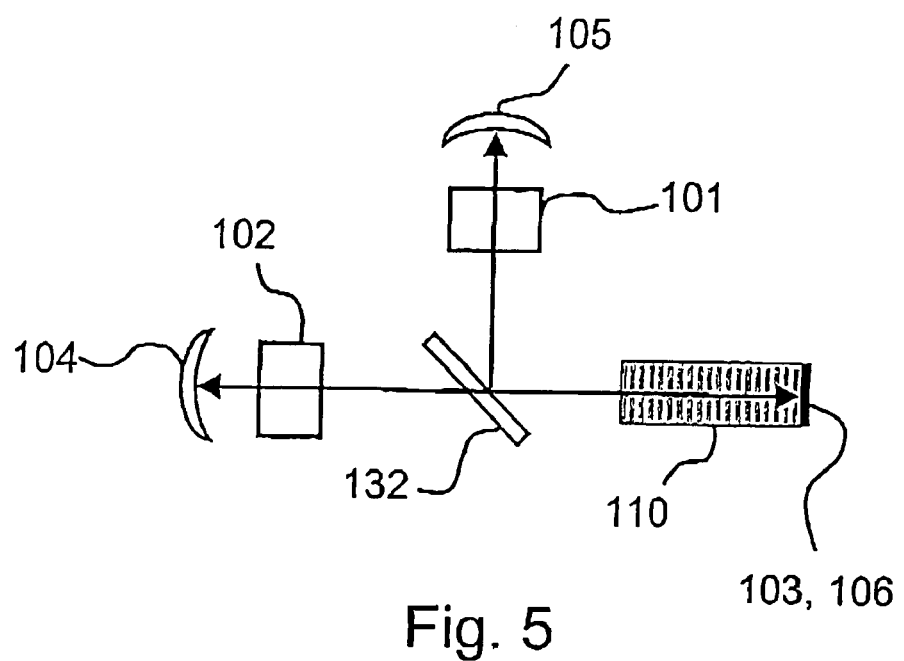
FIG. 5 schematically shows a fifth set-up according to the invention, wherein the sum frequency mixing is performed double resonantly.

Although there might be some stability issues, it can still be preferred to perform the sum frequency mixing in a double resonant configuration, as schematically shown in FIG. 5. When the mixing is performed double resonantly, the non-linear body 110 is inside the resonant cavities of both the four level laser and the three level laser. In the shown arrangement, the non-linear body 110 is provided with a dielectric stack on one of its end surfaces. This dielectric stack constitutes a common cavity mirror for both the four level laser and the three level laser 103, 106. The resonant cavity of the four level laser is further defined by the mirror 105 and a dichroic folding mirror 132. Inside the cavity of the four level laser, there is also provided an active medium 101. The resonant cavity of the three level laser is further defined by the mirror 104. In case of the three level laser, the dichroic folding mirror 132 serves to prevent parasitic lasing at competing four level transitions. Inside the cavity of the three level laser, there is also provided an active medium 102. Consequently, the non-linear crystal 110 is inside of both laser cavities. The intensities at the fundamental frequencies is thus increased within the non-linear crystal.

In conclusion, the present invention provides a method and an arrangement for the generation of coherent radiation at wavelengths that were previously impossible or at least difficult to obtain by means of solid-state lasers. According to the invention, radiation from a four level laser is mixed with radiation from a three level laser (a quasi three level laser) in order to produce radiation at the sum frequency. In particular, wavelengths shorter than those obtainable by frequency doubling of four level lasers are provided. It is preferred that the mixing is performed outside of the resonant cavity defining the three level laser, in order to minimise the influence on the three level laser, which is typically more susceptible to losses and other disturbances than the more robust four level laser. Standard high power diodes may be employed, and this gives the possibility to scale the output power considerably, if so desired.

Although the invention has been described by way of examples, and with reference to the accompanying drawings, it is to be understood that various embodiments are possible within the scope of the invention. For example, other non-linear materials than those mentioned could be employed, and other active media could be used in the solid-state lasers as well as other configurations for the resonant cavities. The embodiments disclosed are illustrative examples and should not limit the scope of the invention, which is defined in the appended claims.

The invention claimed is:

1. A method of generating coherent radiation, comprising the steps of:
    producing a first fundamental beam of radiation at a first frequency by means of a solid-state four level laser;
    producing a second fundamental beam of radiation at a second frequency by means of a solid-state three level laser; and
    mixing said first fundamental beam of radiation and said second fundamental beam of radiation in a non-linear optical body, to obtain an output beam having a frequency which is the sum of said first frequency and said second frequency;
    wherein the first and second fundamental beams have such frequencies that the produced output beam has a wavelength within either of the wavelength ranges 480–510 nm or 535–600 nm.

2. A method as claimed in claim 1 wherein the step of mixing is performed in a non-linear optical body outside of a resonant cavity defining the solid-state three level laser.

3. A method as claimed in claim 1 wherein the step of mixing is performed in a non-linear optical body within a resonant cavity defining the solid-state four level laser.

4. A method as claimed in claim 1 wherein the step of mixing is performed in a non-linear body comprising a quasi-phasematching grating.

5. A method as claimed in claim 4 wherein the step of mixing is performed in a periodically poled crystal selected from the group of non-linear crystals consisting of potassium-titanyl-phosphate (KTP), lithium-niobate (LN), lithium-tantalate (LT), rubidium-titanyl-arsenide (RTA), potassium-titanyl-arsenide (KTA), rubidium-titanyl-phosphate (RTP) and potassium-niobate (KN).

6. A method as claimed in claim 1 wherein the first fundamental beam of radiation is produced by a four level laser having an active medium comprising neodymium ions doped into a host crystal selected from the group of crystals consisting of YAG, $YVO_4$, $GdVO_4$, $YLiF_4$ and $YAlO_3$.

7. A method as claimed in claim 1 wherein the second fundamental beam of radiation is produced by a three level laser having an active medium selected from the group consisting of Nd:YAG, Nd:$YVO_4$, Nd:$GdVO_4$, Nd:$YLiF_4$, Nd:$YAlO_3$, Nd:Glass, Yb:YAG, Yb:S-FAP and Tm:YAG.

8. A method as claimed in claim 1, wherein the first fundamental beam of radiation is generated by means of a solid-state Nd:$YLiF_4$ laser emitting coherent radiation at a wavelength of about 1047 nm, and the second fundamental beam of radiation is generated by means of a solid-state Nd:$YVO_4$ laser emitting coherent radiation at a wavelength of about 914 nm, the step of mixing thus producing an output beam at a wavelength of about 488 nm.

9. A method as claimed in claim 1, wherein the first fundamental beam of radiation is generated by means of a solid-state Nd:$YLiF_4$ laser emitting coherent radiation at a wavelength of about 1053 nm, and the second fundamental beam of radiation is generated by means of a solid-state Nd:$YLiF_4$ laser emitting coherent radiation at a wavelength of about 908 nm, the step of mixing thus producing an output beam at a wavelength of about 488 nm.

10. A method as claimed in claim 1, wherein the first fundamental beam of radiation is generated by means of a solid-state Nd:YAG laser emitting coherent radiation at a wavelength of about 1319 nm, and the second fundamental beam of radiation is generated by means of a solid-state Nd:YAG laser emitting coherent radiation at a wavelength of about 1030 nm, the step of mixing thus producing an output beam at a wavelength of about 578 nm.

11. A method of generating coherent radiation, comprising the steps of: producing a first fundamental beam of radiation at a first frequency by means of a solid-state four level laser;
    producing a second fundamental beam of radiation at a second frequency by means of a solid-state three level laser; and
    mixing said first fundamental beam of radiation and said second fundamental beam of radiation in a non-linear optical body, to obtain an output beam having a frequency which is the sum of said first frequency and said second frequency.
    wherein the step of mixing is performed in a non-collinear configuration, such that the output beam at the sum frequency is non-parallel to both of the fundamental beams of radiation.

12. An arrangement for generating coherent radiation, comprising
    a solid-state four level laser operative to emit a first fundamental beam of radiation at a first frequency,
    a solid-state three level laser operative to emit a second fundamental beam of radiation at a second frequency, and
    a non-linear optical body capable of mixing said first fundamental beam of radiation and said second fundamental beam of radiation into an output beam having a frequency which is the sum of said first frequency and said second frequency;
    wherein the first and second fundamental beams have such frequencies that the produced output beam has a wavelength within either of the wavelength ranges 480–510 nm or 535–600 nm.

13. An arrangement as claimed in claim 12 wherein the non-linear optical body is arranged outside of a resonant cavity defining the three level laser.

14. An arrangement as claimed in claim 13 wherein the non-linear optical body is arranged within a resonant cavity defining the four level laser.

15. An arrangement as claimed in claim 12 wherein the active medium of the solid-state four level laser comprises neodymium ions doped into a host crystal selected from the group of crystals consisting of YAG, $YVO_4$, $GdVO_4$, $YliF_4$ and $YAlO_3$.

16. An arrangement as claimed in claim 12 wherein the active medium of the solid-state three level laser is selected from the group consisting of Nd:YAG, Nd:$YVO_4$, Nd:$GdVO_4$, Nd:$YLiF_4$, Nd:$YAlO_3$, Nd:Glass, Yb:YAG, Yb:S-FAP and Tm:YAG.

17. An arrangement for generating coherent radiation, comprising
    a solid-state four level laser operative to emit a first fundamental beam of radiation at a first frequency;
    a solid-state three level laser operative to emit a second fundamental beam of radiation at a second frequency; and
    a non-linear optical body capable of mixing said first fundamental beam of radiation and said second fundamental beam of radiation into an output beam having a frequency which is the sum of said first frequency and said second frequency;
wherein the non-linear optical body is positioned within both the four level laser and the three level laser, and said non-linear body is designed to provide phasematching for sum frequency generation in a direction that is non-parallel to both the first fundamental beam and the second fundamental beam.

18. An arrangement as claimed in claim 12 wherein the non-linear optical body comprises a quasi phasematching grating.

19. An arrangement as claimed in claim 18 wherein the non-linear body is a periodically poled crystal selected from the group of non-linear crystals consisting of potassium-titanyl-phosphate (KTP), lithium-niobate (LN), lithium-tantalate (LT), rubidium-titanyl-arsenide (RTA), potassium-titanyl-arsenide (KTA), rubidium-titanyl-phosphate (RTP) and potassium-niobate (KN).

20. A method as claimed in claim 2 wherein the step of mixing is performed in a non-linear optical body within a resonant cavity defining the solid-state four level laser.

* * * * *